United States Patent
Zhang

(10) Patent No.: US 6,785,612 B1
(45) Date of Patent: Aug. 31, 2004

(54) SEISMIC VELOCITY UPDATE FOR ANISOTROPIC DEPTH MIGRATION

(75) Inventor: Yaohui Zhang, Katy, TX (US)

(73) Assignee: PGS Americas, Inc., Houston, TX (US)

( * ) Notice: Subject to any disclaimer, the term of this patent is extended or adjusted under 35 U.S.C. 154(b) by 0 days.

(21) Appl. No.: 10/447,987

(22) Filed: May 29, 2003

(51) Int. Cl.[7] .................................................. G01V 1/00
(52) U.S. Cl. ........................................... 702/14; 703/10
(58) Field of Search ............................... 702/14, 18, 6; 367/75, 27; 73/152.01

(56) References Cited

U.S. PATENT DOCUMENTS

| | | | | |
|---|---|---|---|---|
| 5,343,441 A | * | 8/1994 | Alford | ........................... 367/75 |
| 6,128,580 A | * | 10/2000 | Thomsen | ...................... 702/18 |
| 6,351,991 B1 | * | 3/2002 | Sinha | ...................... 73/152.01 |

OTHER PUBLICATIONS

Leon Thomsen, "Weak elastic anisotropy", Geophysics, Oct. 1986, pp. 1954–1966, vol. 51, No. 10.

Ilya Tsvankin, Vladimir Grechka, "Parameter estimation for VTI media using PP and PS reflection data", Society of Exploration Geophysicists International Exposition and 71st Annual Meeting, Sep. 2001, pp. 857–860, vol. I.

Yaohui Zhang, Min Lou, Don Pham, "Velocity Update via Joint Velocity Inversion for Anisotropic Depth Migration", Society of Exploration Geophysicists International Exposition and 72nd Annual Meeting, Oct. 2002, pp. 141–144, vol. I.

Stuart William Fagin, "Model Based Depth Imaging ", Society of Exploration Geophysicists, 1998, ISBN 0–931830–48–6.

Gerald H. .F. Gardner, "Migration of Seismic Data", Society of Exploration Geophysicists, 1985, ISB 9–31830–35–4, Geophysics Reprint Series.

Yaohui Zhang, Long Don Pham, Fernando Neves, "Depth–Consistent P–P and P–S Seismic Image via Joint Velocity Inversion", Society of Exploration Geophysicists 71st Annual International Meeting, 2001, pp. 841–844.

Tariq Alkhalifah, "Velocity analysis using non hyperbolic moveout in transversely isotropic media", Geophysics, 1997, pp. 1839–1854, vol. 62, No. 6.

Richard Bale, Paul Farmer, Jan Ove Hansen, Dave Nichols, Gopal Palacharla, "Prestack Depth Migration of Converted Wave Data in Anisotropic Media", Society of Exploration Geophysicists International Exposition and 68th Annual Meeting, Sep. 1998, pp. 1108–1111, vol. II.

(List continued on next page.)

Primary Examiner—John Barlow
Assistant Examiner—Victor J. Taylor
(74) Attorney, Agent, or Firm—E. Eugene Thigpen

(57) ABSTRACT

A method of updating velocity whereby corresponding reflections are identified from P-P and P-S near-offset waves received from a seismic source and reflected by a subsurface layer to form P-P and P-S depth consistent image gathers. A joint velocity inversion in depth is performed on the P-P and P-S depth consistent image gathers to estimate a vertical depth $z_o$, vertical P-wave velocity $v_{po}$, and vertical S-wave velocity $v_{so}$ of the subsurface layer. An isotropic depth migration of P-P depth consistent image gathers is determined based upon the depth $z_o$, P-wave velocity $v_{po}$, and S-wave velocity $v_{so}$ to estimate a vertical isotropic depth $z_{pp}$ of the subsurface layer. Anisotropic parameters $\delta$ and $\sigma$ are calculated based upon the depth $z_{pp}$, P-wave velocity $v_{p0}$, and S-wave velocity $v_{so}$. The above steps are repeated, beginning with the joint velocity inversion, until the P-wave velocity $v_{po}$ and S-wave velocity $v_{so}$ are substantially unchanged.

8 Claims, 10 Drawing Sheets

OTHER PUBLICATIONS

Oleg Mikhailov, Jackie Johnson, Elena Shoshitaishvili, Clint Frasier "Practical approach to joint imaging of multicomponent data", The Leading Edge, Sep. 2001, pp. 1016–1021, vol. 20, No. 9.

Bertram Nolte, Dwight Sukup, Kevin Bishop, "Anisotropic Prestack Depth Migration of Converted-Wave Data from the Gulf of Mexico", Society of Exploration Geophysicist International Exposition and 69$^{th}$ Annual Meeting, 1999, pp. 691–694, vol. I.

Min Lou, Yaohui Zhang, Long Don Pham, Detection of shear-wave splitting and fracture orientation from PS waves at the Valhall Field, EAGE 63$^{rd}$ Conference & Technical Exhibition, Jun. 2001, Amsterdam, The Netherlands.

Jerry Yuan, Xiang-Yang Li, Anton Ziolkowski, "Converted-Wave Moveout Analysis in Layered Anisotropic Media—A Case Study", EAGE 63$^{rd}$ Conference & Technical Exhibition, Jun. 2001, Amsterdam, The Netherlands.

* cited by examiner

SEISMIC VELOCITY UPDATE FOR ANISOTROPIC DEPTH MIGRATION

RELATED PATENT APPLICATION

U.S. patent application Ser. No. 09/877,316; filing date of Jun. 8, 2001; assigned to the assignee of the present invention, and with title, "Extraction Of P-Wave and S-Wave Velocities From Multi-Component Seismic Data By Joint Velocity Inversion".

FIELD OF THE INVENTION

The present invention relates generally to the field of seismic data processing, and more particularly to a method for determining the vertical depth and the vertical P-wave and S-wave velocities to estimate anisotropic parameters via prestack depth migration of P-P and P-S seismic data in the presence of VTI anisotropy.

BACKGROUND OF THE INVENTION

A seismic survey begins with the sending of acoustic energy from a source such as an explosion, air gun, or seismic vibrator into the earth in the form of a non-polarized, omni-directional wavefield, and the recording by spaced-apart seismic sensors of acoustic energy which is reflected or refracted back from inhomogeneities or discontinuities in subsurface layers. Seismic energy propagates through the earth as compresional P-waves and shear S-waves. P-waves propagate in-line with the direction of travel of the source acoustic energy, and S-waves flow transversely and horizontally ("SH wave") as well as vertically ("SV" wave) with respect to the direction of travel of the source acoustic energy. At any subsurface discontinuity, a P-wave may convert to an S-wave. If the conversion happens only once from an incident P-wave to a reflected S-wave, the converted wave is referred to as a P-S converted wave, C-mode converted wave, or C-wave.

Referring to FIG. 1, a thick uniform isotropic layer of thickness "z" is shown with an acoustic energy source "S" and a seismic detector "R" which are a distance of "x" apart. The distance "x" is referred to as the offset between the source "S" and the detector "R". A compression or P-wave 11 originates from the source "S", and is reflected from the bottom of the layer 10 at a horizontal distance of x/2 from the source "S". The reflected acoustic energy wave is a P-wave 12 that is sensed and recorded by detector "R", which may be a hydrophone or geophone. A further P-wave 13 originates from the source "S", and is reflected from the bottom of layer 10 a horizontal distance of "s+$x_c$" from the source "S". P-wave 13 undergoes a conversion to a shear or S-wave 14 upon reflection from the bottom of the layer 10. As before stated, since the conversion occurs only once, the converted wave may be referred to as a C-mode converted wave or C-wave.

Subsurface layers which are isotropic exhibit the same velocity of propagation of acoustic energy in all directions. Other subsurface layers are anisotropic in that the velocity of propagation of acoustic energy is azimuth dependent. Flat-lying polar anisotropic ("VTI") subsurface layers, also referred to as transversely isotropic media with vertical symmetry, give rise to only one C-mode reflection.

Conventional seismic processing relies heavily on a stack (or average) of seismic traces from a common midpoint ("CMP") gather to reduce coherent and incoherent noise in a seismic section. The stacking approach is generally satisfactory for single mode seismic data (P-wave, S-wave), but often fails when applied to converted mode (C-wave) data due to the asymmetrical travel paths. Data for a true common reflection point ("CRP"), which for C-wave reflections is a common conversion point gather ("CCP"), is required.

Reflection data of all types, whether P-wave or S-wave, must be corrected for irregular time delays. As reflection events are detected by seismic detectors increasingly distant from the source "S", the arrival time of the reflected signals becomes increasingly long. Such a systematic shift to longer reflection times due to increasing source-detector offsets is generally referred to as normal moveout or NMO. It is well known that normal moveout causes errors in determining compressional and shear wave velocities. If such errors remain uncorrected, stacked amplitudes of seismic events will be misaligned, and the behavior of reflecting interfaces between subsurface layers will be misrepresented.

To overcome the above maladies, methods for establishing and updating velocity models have become two important steps for multicomponent P-P and P-S prestack seismic depth imaging. Five anisotropic processing parameters are commonly used in multicomponent data processing: the vertical P-P velocity $v_{po}$, the vertical P-S velocity $v_{so}$, the vertical depth $z_o$, and the parameters δ and σ as defined in the articles, "Weak elastic anisotropy", by L. Thomsen, Geophysics, vol. 51, pp. 1954–1966 (October 1986) and "Parameter estimation for VTI media using PP and PS reflection data", by Ilya Tsvankin and Vladimir Grechka, Proceedings of the 71$^{st}$ Annual International Meeting of the Society of Exploration Geophysicists (Copyright 2001). The anisotropic parameter δ is defined by:

$$\delta = \frac{(C_{13} + C_{44})^2 - (C_{33} - C_{44})^2}{2C_{33}(C_{33} - C_{44})},$$

where $C_{ij}$ are the components of the 6×6 symmetric elastic modulus matrix relating the stress components of a linearly elastic material to a linear combination of the strain components. The anisotropic parameter σ is defined by:

$$\sigma = \left(\frac{v_{po}}{v_{so}}\right)^2 (\varepsilon - \delta),$$

where the anisotropic parameter ε is defined by:

$$\varepsilon = \frac{C_{11} - C_{33}}{2C_{33}}.$$

The uncertainty caused by the presence of anisotropy in the estimation of vertical velocity and depth is addressed in Tsvankin and Grechka (2001). Unfortunately, no prior method is known which is successful in overcoming errors in determining such anisotropic processing parameters in the presence of a VTI anisotropic subsurface layer.

The present invention is directed to a method of depth consistent joint velocity inversion for substantially overcoming errors in estimating the anisotropic parameters $v_{so}$, $v_{po}$, δ, σ, and the vertical depth $z_0$ in a VTI anisotropic subsurface layer.

SUMMARY OF THE INVENTION

A process for updating velocity determinations for anisotropic P-P and P-S prestack depth migration in a transversely isotropic media with vertical symmetry (VTI).

In one aspect of the invention, upon corresponding reflections from P-P and P-S waves being identified, a depth consistent image gather is formed and a joint velocity inversion in depth is performed to estimate vertical depth $z_o$, vertical P-wave velocity $v_{po}$, and vertical S-wave velocity $v_{so}$.

In a second aspect of the invention, an isotropic depth migration using the above estimates of $v_{so}$, $v_{po}$, and $z_o$ is performed by scanning focusing velocities from P-P depth consistent image gathers to determine an isotropic depth $z_{pp}$.

In a third aspect of the invention, anisotropic parameters δ and σ are estimated based upon the above estimates of $v_{po}$, $v_{so}$, $z_o$, and $z_{pp}$.

In a fourth aspect of the invention, the above estimates of $v_{po}$, $v_{so}$, $z_o$, and $z_{pp}$, and the anisotropic parameters δ and σ are used to refine the estimates $v_{so}$, $v_{po}$, and $z_o$.

In another aspect of the invention, VTI anisotropic parameters may be determined (whether or not well log data is available) to produce reliable P-P and P-S depth consistent imaging.

BRIEF DESCRIPTION OF THE DRAWINGS

The novel features of the invention will be better understood from the following detailed description when taken in conjunction with the following drawings, in which.

DESCRIPTION OF PREFERRED EMBODIMENTS

The following detailed description is of an illustrative example of the invention, and is not intended as a definition of the limits of the invention.

Figure 1:
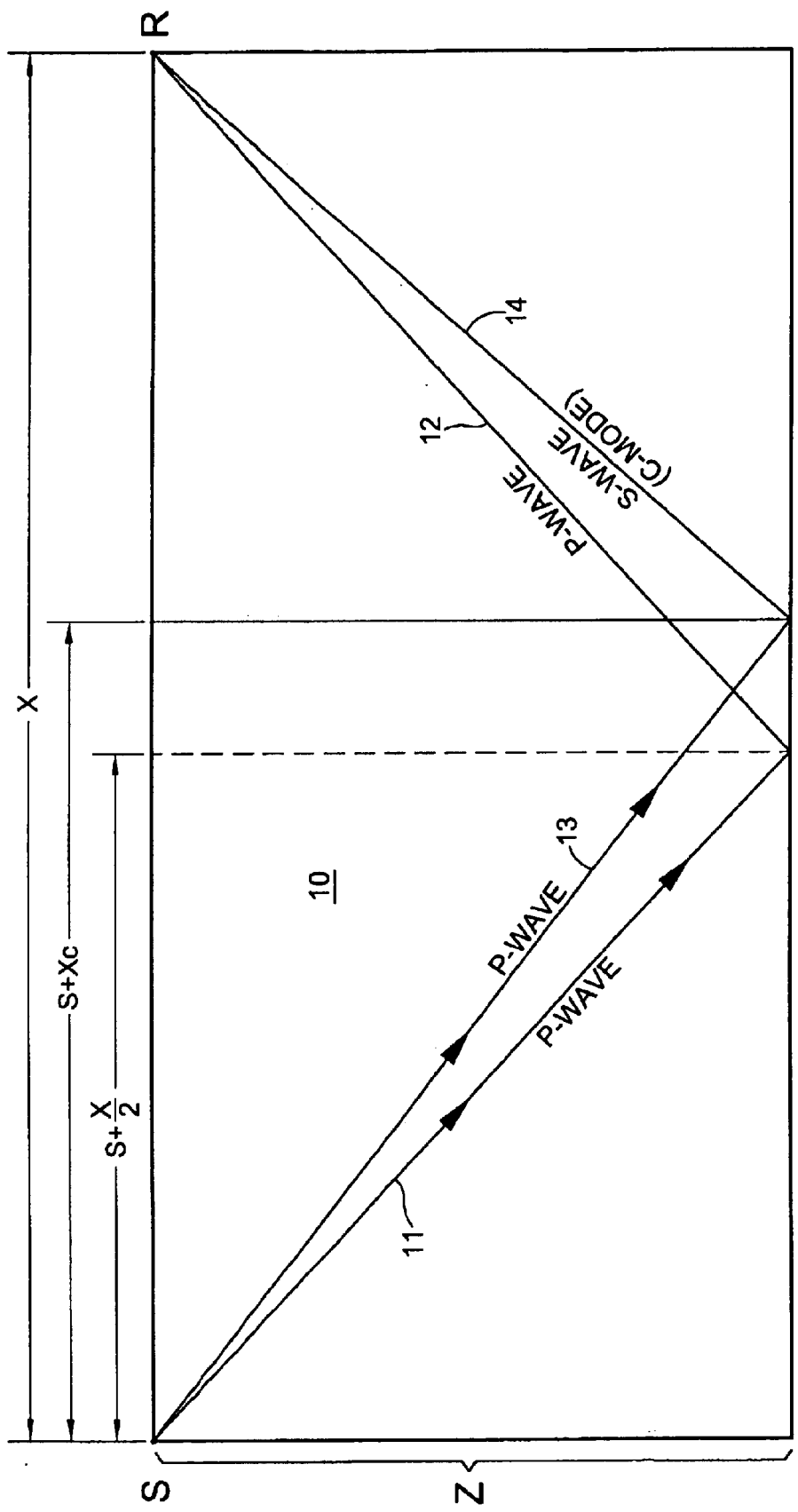
FIG. 1 is a graphic prior art representation of seismic P-waves, S-waves, and C-waves.
Figure 2:
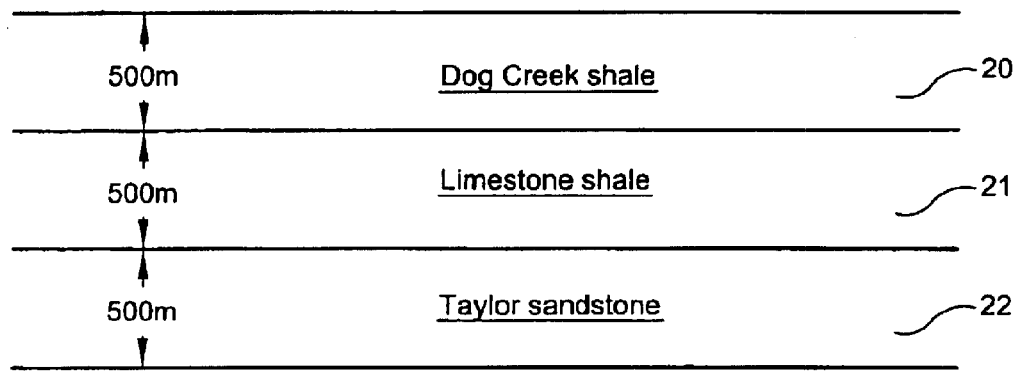
FIG. 2 is a graphic view of a three-layered VTI model comprised of Dog Creek shale, Limestone shale, and Taylor sandstone.

Referring to FIG. 2, a VTI model comprised of a Dog Creek shale layer 20, a Limestone shale layer 21, and a Taylor sandstone layer 22 is illustrated. In order to determine and update strata velocities to establish seismic depth imaging, four anisotropic processing parameters are commonly used in multicomponent data processing: vertical P-wave velocity $v_{po}$, vertical S-wave velocity $v_{so}$, the aniso-tropic parameter ε, and the anisotropic parameter δ. References to anisotropic parameters σ, ε, and δ refer to the anisotropic parameters defined in the articles "Weak elastic anisotropy", by L. Thomsen, Geophysics, vol. 51, pp. 1954–1966 (October 1986) and "Parameter estimation for VTI media using PP and PS reflection data", by Ilya Tsvankin and Vladimir Grechka Proceedings of the 71$^{st}$ Annual International Meeting of the Society of Exploration Geophysicists (Copyright 2001), both discussed above.

In the hypothetical VTI model of FIG. 2, layer 20 is characterized by a vertical P-wave velocity $v_{po}$=1875 m/s, a vertical S-wave velocity $v_{so}$=826 m/s, anisotropic parameter ε=0.225, and anisotropic parameter δ=0.100. Layer 21 is characterized by a vertical P-wave velocity $v_{po}$=3306 m/s, a vertical S-wave velocity $v_{so}$=1819 m/s, anisotropic parameter ε=0.134, and anisotropic parameter δ=0.000. Lastly, layer 22 is characterized by a vertical P-wave velocity $v_{p0}$=3368 m/s, a vertical S-wave velocity $v_{so}$=1829 m/s, anisotropic parameter ε=0.110, and anisotropic parameter δ0.035.

Figure 3:
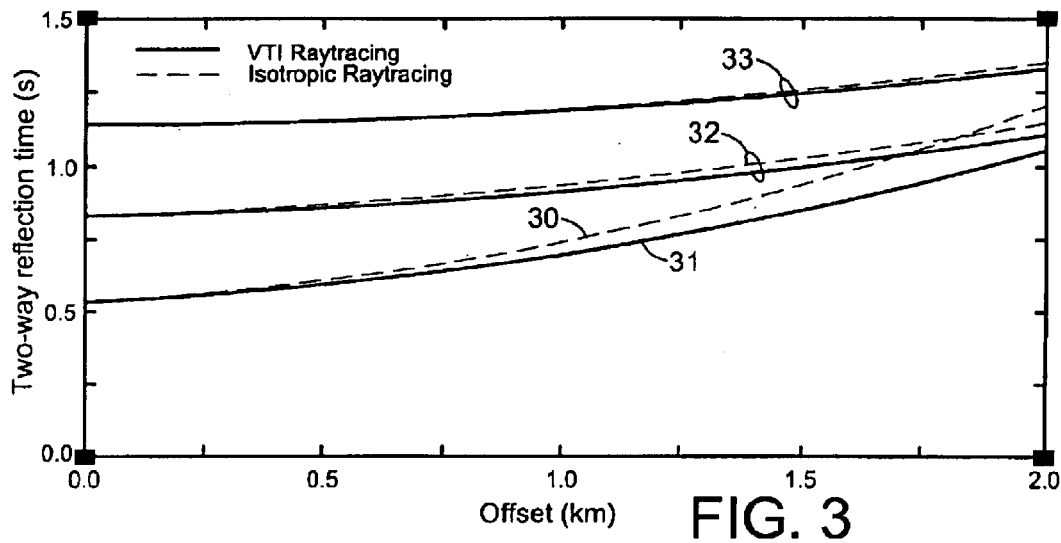
FIG. 3 is a graph of isotropic and VTI P-P offset-travel time curves for the VTI model of FIG. 2.

Referring to FIG. 3, both VTI and isotropic offset-travel time curves for P-P waves are shown for each of the layers 20, 21, and 22 of FIG. 2. More particularly, curves 30 and 31 of FIG. 3 respectively show isotropic and VTI curves for two way reflections within the Dog Creek shale of layer 20 of FIG. 2 with increasing offset. At near offset, the two curves 30 and 31 of FIG. 3 overlap. As the offset increases beyond 0.5 kilometers, however, the separation between the curves increases. The curve sets 32 and 33, with dotted line curves representing isotropic layers and solid line curves representing VTI layers, show similar results for layers 21 and layer 22 of FIG. 2, respectively.

Figure 4:
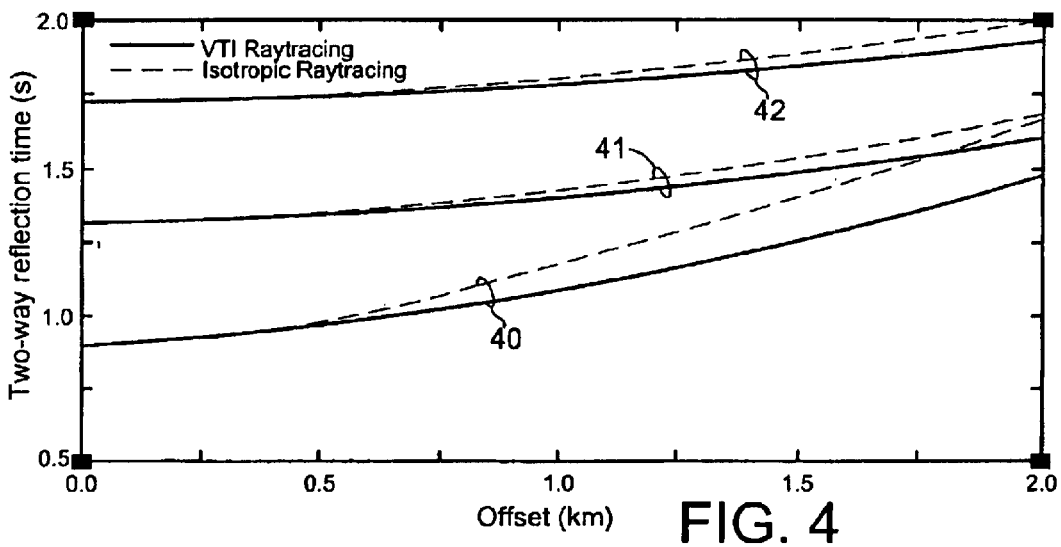
FIG. 4 is a graph of isotropic and VTI P-S offset-travel time curves for the VTI model of FIG. 2.

FIG. 4 shows VTI and isotropic offset-travel time curves for P-S waves within layers 20, 21, and 22 of FIG. 2. The curve set 40 of FIG. 4 shows that at about an offset of 0.30 kilometers, the isotropic and VTI curves begin to separate, and thereafter increasingly separate with increasing offset for layer 20 of FIG. 2. Further, the curve set 41 of FIG. 4 shows that at about an offset of 0.65 kilometers, the isotropic and VTI curves begin to separate, and thereafter increasingly separate with increasing offset for layer 21 of FIG. 2. Lastly, the curve set 42 of FIG. 4 shows that for layer 22 of FIG. 2, the isotropic and VTI curves begin to separate at about an offset of 0.65 kilometers, and thereafter increasingly separate with increasing offset.

The travel time behavior illustrated in FIGS. 3 and 4 indicates that the ratio $\gamma_0 = v_{po}/v_{so}$ is unchanged for both isotropic and VTI strata at near offsets. In view of the above, in accordance with the present invention, iterative equations of joint velocity inversion in the depth domain may be used to estimate vertical P- and S-wave velocities in a VTI anisotropic layer as follows:

$$v_{po}^{(i)} = v_{po}^{(i-1)} + \frac{z_s^{(i-1)} - z_p^{(i-1)}}{z_p^{(i-1)}} \frac{\gamma_o^{(i-1)} v_{po}^{(i-1)}}{1 + \gamma_o^{(i-1)}}, \quad (1)$$

$z_p$ and $z_s$ are respectively the P-P and P-S depth migrations;

$v_{p0}$ is the vertical P-wave velocity;

$v_{so}$ is the vertical S-wave velocity;

$\gamma_0$ is the velocity ratio $v_{po}/v_{so}$; and
i denotes the iteration cycle;

$$v_{so}^{(i)} = v_{so}^{(i-1)} + \frac{z_p^{(i-1)} - z_s^{(i-1)}}{z_s^{(i-1)}} \frac{v_{so}^{(i-1)}}{1+\gamma_o^{(i-1)}}; \tag{2}$$

$$z_p^{(i)} = z_p^{(i-1)} + \frac{\gamma_o^{(i-1)}(z_s^{(i-1)} - z_p^{(i-1)})}{1+\gamma_o^{(i-1)}}; \text{ and} \tag{3}$$

$$z_s^{(i)} = z_s^{(i-1)} + \frac{(z_p^{(i-1)} - z_s^{(i-1)})}{1+\gamma_o^{(i-1)}}. \tag{4}$$

It has been found that $v_{po}^{(i)}$ and $v_{so}^{(i)}$ respectively converge to $v_{po}$ and $v_{so}$ in approximately seven iterations, and that $z_p$ and $z_s$ respectively converge to the vertical depth $z_o$ in only a few (order of ten) iterations. Thus, it is seen that the depth consistent joint velocity inversion of the present invention provides three critical parameters for the estimation of anisotropic parameters for depth migration in the presence of VTI anisotropy: vertical depth $z_o$, vertical P-wave velocity $v_{po}$, and vertical S-wave velocity $v_{so}$.

Once the vertical P- and S-wave velocities are determined, the isotropic depth $Z_{pp}$ is preferably determined by performing an isotropic depth migration, well known in the art, and described, for example, in the article "Velocity Update via Joint Velocity Inversion for Anisotropic Depth Migration", by Yaohui Zhang, Min Lou, and Long Don Pham, Proceedings of the $72^{nd}$ Annual Intentional Meeting of the Society of Exploration Geophysicists, pages 141–144 (Copyright 2002). This isotropic depth migration is performed by scanning the focusing velocities from the depth image gathers to obtain a best focused depth. Thereafter, the depth difference $z_{pp} - z_o$ may be determined, and the anisotropic parameters $\delta$ and $\sigma$ may be estimated for depth migration of P-P and P-S seismic data in the presence of VTI anisotropy. The anisotropic parameter $\delta$ may be estimated as follows:

$$\delta \approx \frac{z_{pp} - z_o}{z_o} = \frac{\Delta z_{pp}}{z_o}, \tag{5}$$

where $z_{pp}$ is the isotropic depth determined from a P-P isotropic processing of seismic data.

A first order approximation of 6 then may be taken to approximate the anisotropic parameter a as follows:

$$\sigma \approx \gamma_o^2 \left(\frac{\Delta z_{pp}}{z_o^2}\right)\left[\frac{\gamma_o}{2} \frac{\Delta z_{pp}}{z_o} + 1\right]. \tag{6}$$

An anisotropic prestack depth migration then may be performed with the parameters $v_{po}$, $v_{so}$, $\delta$, and $\sigma$. The methods for determining pre-stack depth migration are well known in the art and are disclosed, for example, in a general overview in the publication "Model Based Depth Imaging", by Stuart Fagin, Society of Exploration Geophysicists, ISBN 0-931830-48-6 (Copyright 1998).

Figure 5:
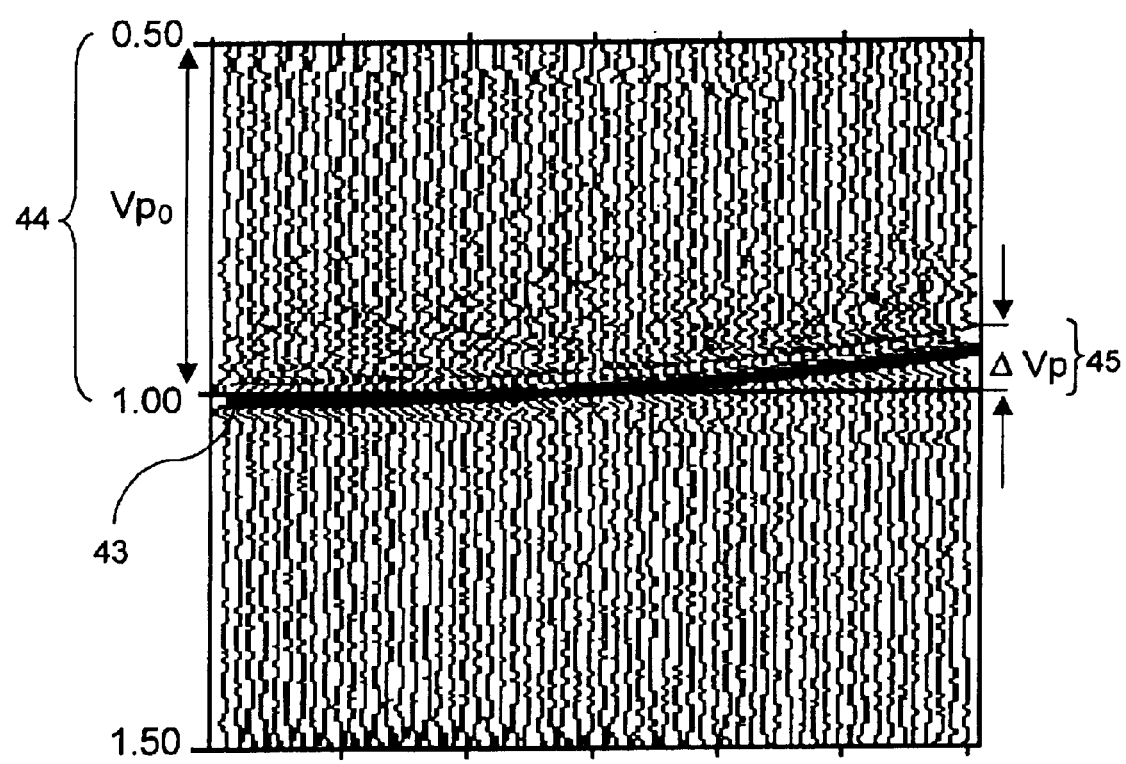
FIG. 5 is a graphic representation of a depth consistent P-P depth image gather in the presence of VTI anisotropy.
Figure 6:
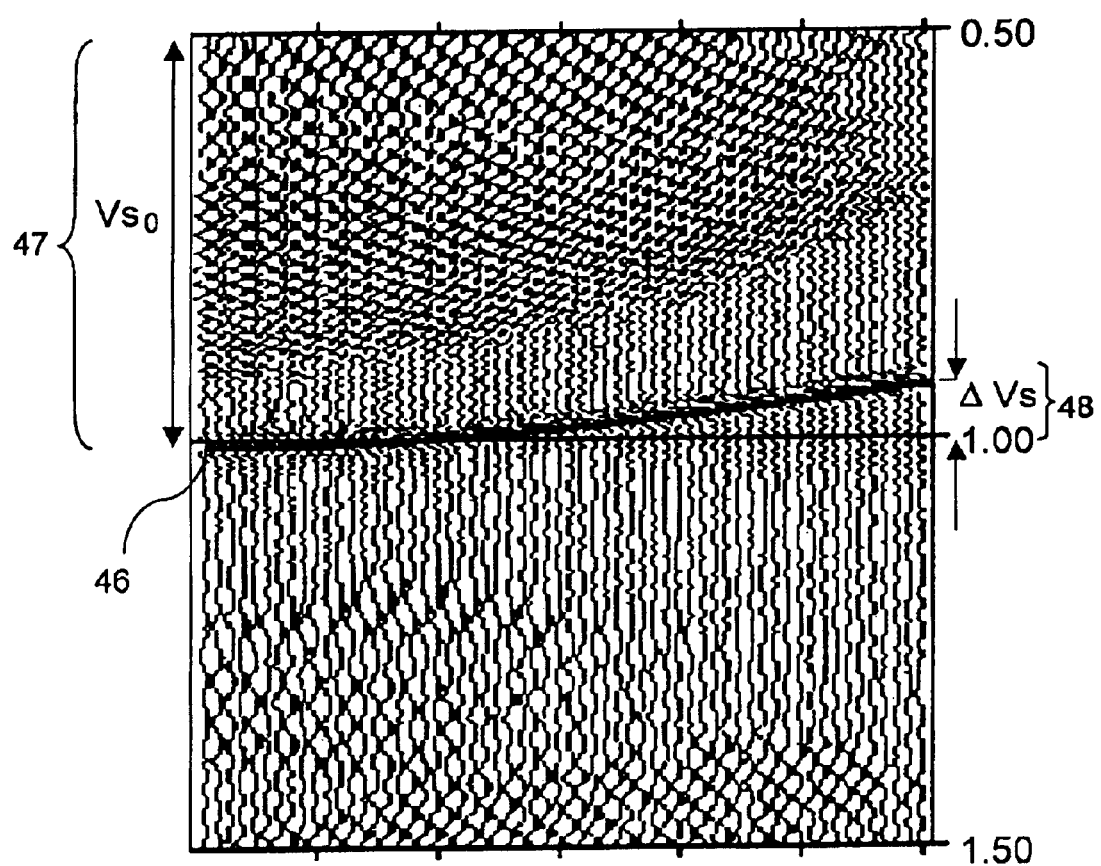
FIG. 6 is a graphic representation of a depth consistent P-S depth image gather in the presence of VTI anisotropy

Referring to FIG. 5, a P-P depth-consistent VTI image gather depicting $v_{po}$ at varying depths is illustrated. At a corrected depth $z_o$ at reference number 44 of one kilometer for the geological model of FIG. 2, the velocity $v_{po}$ of FIG. 5 is shown to become more consistent about the $v_{po}$ line 43 having a focus velocity $\Delta v_p$ at reference number 45. The focus velocity $\Delta v_p$ is a residual velocity that is a measure of the focus and thus clarity of the image gather. In like manner, FIG. 6 illustrates a P-S depth-consistent VTI image gather depicting $v_{so}$ at varying depths. At a corrected depth $z_o$ at reference number 47 of one kilometer for the geological model of FIG. 2, the velocity $v_{so}$ is shown to be more consistent about the $v_{so}$ line 46, which has a focus velocity $\Delta v_s$ at reference number 48 that is a measure of image gather focus.

Best focus of the image gathers occur when the image gather lines 43 and 46 are flat or horizontal.

Figure 7:
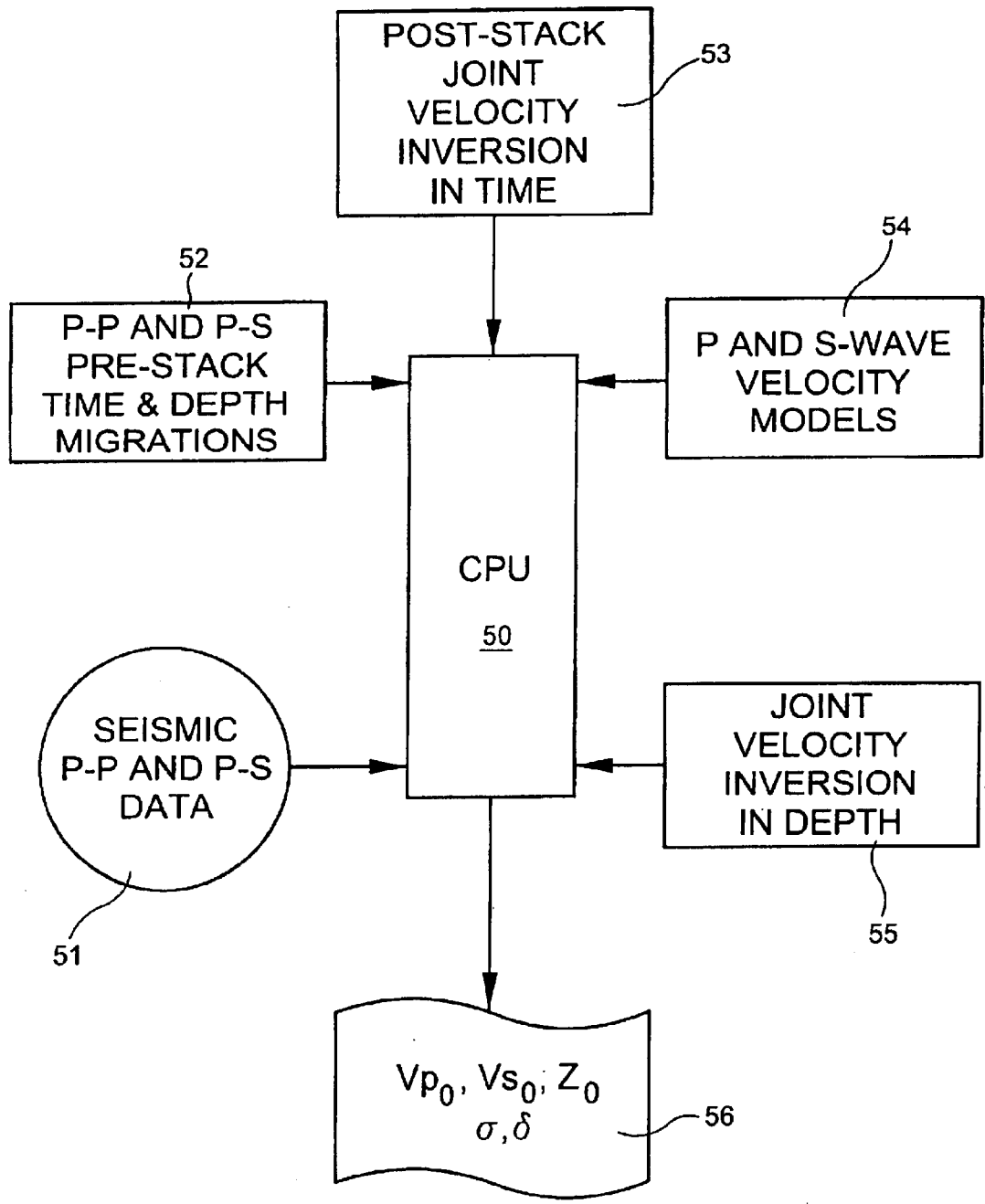
FIG. 7 is a functional block diagram of the system in which the invention operates.

Referring to FIG. 7, the working environment of the invention is shown with a central processing unit or CPU 50 receiving seismic P-P and P-S data from a seismic source 51, which may be a wired, wireless, or magnetically recorded source. The CPU 50 processes such seismic data to determine P-P and P-S pre-stack time and depth migrations as represented by reference number 52, and thereafter performs a post-stack joint velocity inversion in time as indicated by reference number 53 to establish P- and S-wave velocity models as represented by reference number 54. Thereafter, a joint velocity inversion in depth is performed as indicated by reference number 55 to produce the parameters $v_{po}$, $V_{so}$, $z_o$, $\delta$, and $\sigma$ as represented by reference number 56.

Figure 8:
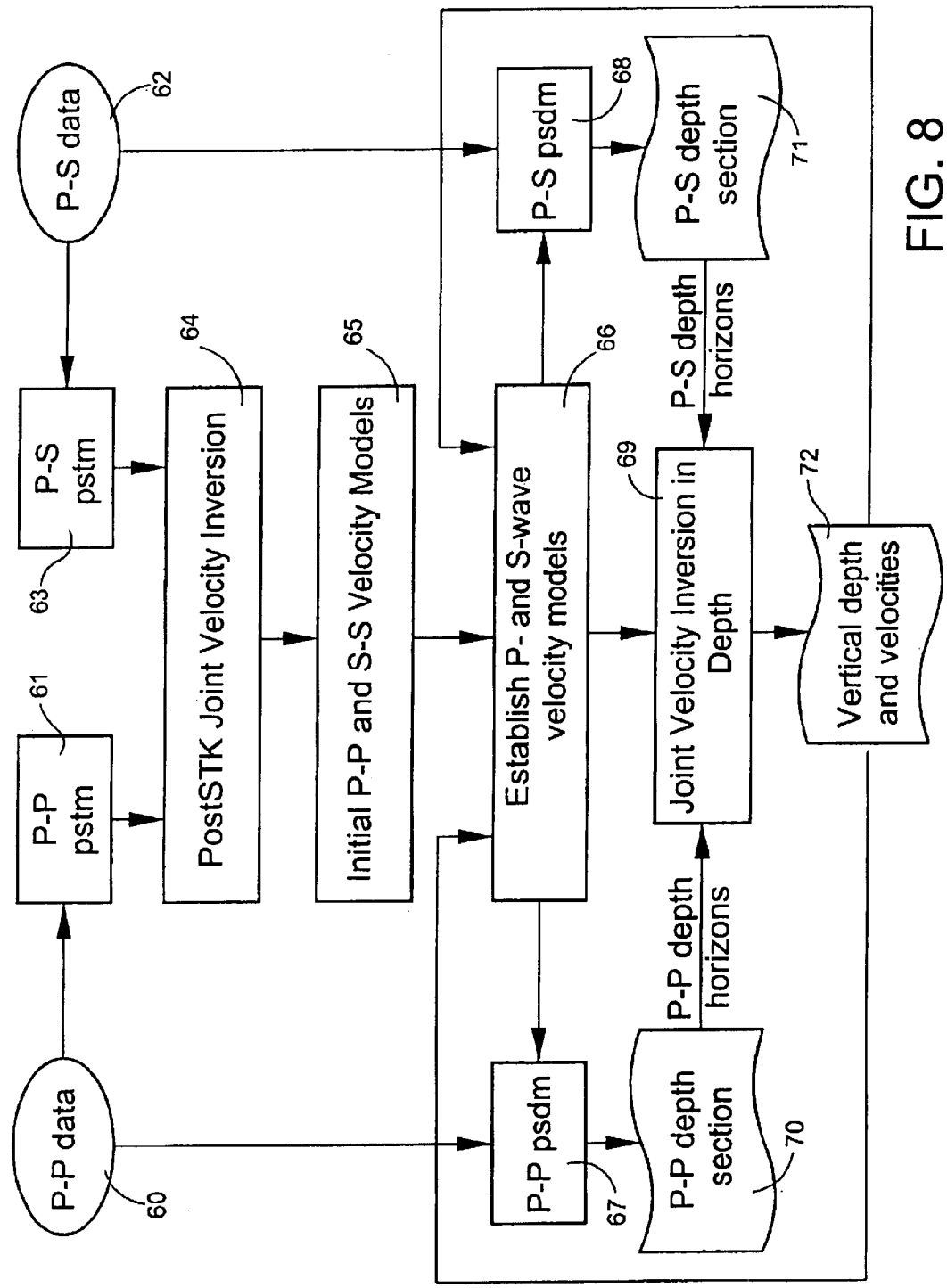
FIG. 8 is a logic flow diagram of the operation of the invention.

FIG. 8 illustrates the operation of the invention in a logic flow diagram form, where P-P seismic data is received by way of either wired or wireless transmission, or magnetically recorded media at a seismic source ore receiver 60, and thereafter near-offset segments of such data are operated upon at a logic step 61 by CPU 50 of FIG. 5 to determine P-P wave pre-stack time migration. In like manner, P-S seismic data is similarly received at a seismic source or receiver 62 of FIG. 6, and thereafter near-offset segments of such P-S seismic data are operated upon at a logic step 63 by CPU 50 of FIG. 5 to determine P-S wave pre-stack time migration. The process for determining the time migrations are well known in the art and may be that disclosed, for example, in a general overview in the article "Migration of Seismic Data", edited by Gerald H. G. Gardner, Society of Exploration Geophysicists, ISBN 0-931830-35-4 (Copyright 1985).

The time migrations determined at logic steps 61 and 63 of FIG. 8 prepare the migrated data for post stack inversion. The output of logic steps 61 and 63 are each applied as inputs to logic step 64, where a post stack joint velocity inversion is preferable made as disclosed in the publication "Depth Consistent P-P and P-S Seismic Image via Joint Velocity Inversion", by Yaohui Zhang, Long Don Pham, and Fernando Neves, Proceedings of the $71^{st}$ Annual International Meeting of the Society of Exploration Geophysicists, pp. 841–844 (Copyright 2001). Yaohui Zhang, et al. (2001) describe the joint velocity inversion as performed by the following steps: (1) estimating the P-wave rms velocity $v_p$ from P-wave data; (2) estimating the rms ratio $v_s/v_p$ from P-S data; (3) computing P-wave rms velocity in P-S time from the results of steps (1) and (2); (4) computing rms $v_s/v_p$ in P-S time from the output of steps (1) and (3); (5) computing the rms velocity $v_s$ in the S-S domain; (6) computing a P-wave interval velocity $v_p$ via the Dix equation in P-P time; (7) computing an S-wave interval velocity $v_s$ via the Dix equation in S-S time; (8) building an initial velocity model from P-P and P-S horizon picks and the initial P and S interval velocities; (9) updating the thickness of P-P and P-S for the selected layer; (10) checking for a depth-consistent P and S velocity field; (11) if a depth-consistent velocity field is not obtained, then balancing the depths, computing new velocity errors for both the P- and S-waves, updating the P and S velocity field, and returning to step (9); and (12) if a depth-consistent velocity field is obtained, then outputting the interval velocities, performing layer stripping, and repeating steps (9) to (12) for the next layers. The interval velocities in depth obtained in logic step 64 are applied to a logic step 65 where initial P-P and P-S velocity models are created in accordance with the methods disclosed in the above publication. The initial velocity models developed in logic step 65 are then applied to a logic step 66 to establish P- and S-wave velocity models for velocity ray tracing in accordance with methods well known in the art and disclosed, for example, in the above publication. The results of the process of determining the P- and S-wave velocity models at logic step 66 then are applied to a logic step 67, to a logic step 68, and to a logic step 69. The logic step 67 also receives near-offset P-P seismic data from receiver 60, and the logic step 68 receives P-S seismic data from receiver 62.

Upon receiving the seismic data from receiver 60 and the velocity model results from logic step 66, the P-P pre-stack depth migration is determined at logic step 67, and a P-P depth image gather is formed and output for display at logic step 70. Similarly, the P-S pre-stack depth migration is determined at logic step 68 upon receipt of the seismic data from receiver 62 and the velocity model output of logic step 66. A P-S depth image gather is then formed and output from logic step 68 is then formed and output from logic step 68 for display at logic step. 71. The methods for determining pre-stack depth migration are well known in the art and are disclosed, for example, in a general overview in the publication "Model Based Depth Imaging", by Stuart Fagin, Society of Exploration Geophysicists, ISBN 0-931830-48-6 (Copyright 1998). The displays at logic steps 70 and 71 are in the form of depth sections, where each depth section may be comprised of plural image gathers.

Corresponding depth consistent image gathers or horizons representing a subsurface layer are selected from the prestack P-P depth sections of logic step 70 and the prestack P-S depth sections of logic step 71. The selected depth consistent image gathers undergo a velocity inversion in the depth domain in accordance with equations (1) through (4) above to estimate the vertical P- and S-wave velocities $v_{po}$ and $v_{so}$, and the vertical depth $z_o$. These results are fed to a logic step 72 where isotropic depth migration for P-P waves is performed by scanning the focusing velocity for P-P waves to obtain a best-focused depth and thus determine an isotropic depth $z_{pp}$. Thereafter, estimates for anisotropic parameters δ and σ are determined from equations (5) and (6) above, and are integrated with the depth consistent velocity model of logic step 69 to complete the anisotropic prestack depth migration procedure. More particularly, the results of the logic step 72 processing are fed back as inputs to logic step 66 to repeat the processing of logic steps 67–72 to further refine the accuracy of the velocity and depth estimations. The feedback through logic steps 67–72 continues until vertical velocity stability as indicted by least values of focusing velocities is obtained.

Figure 9:
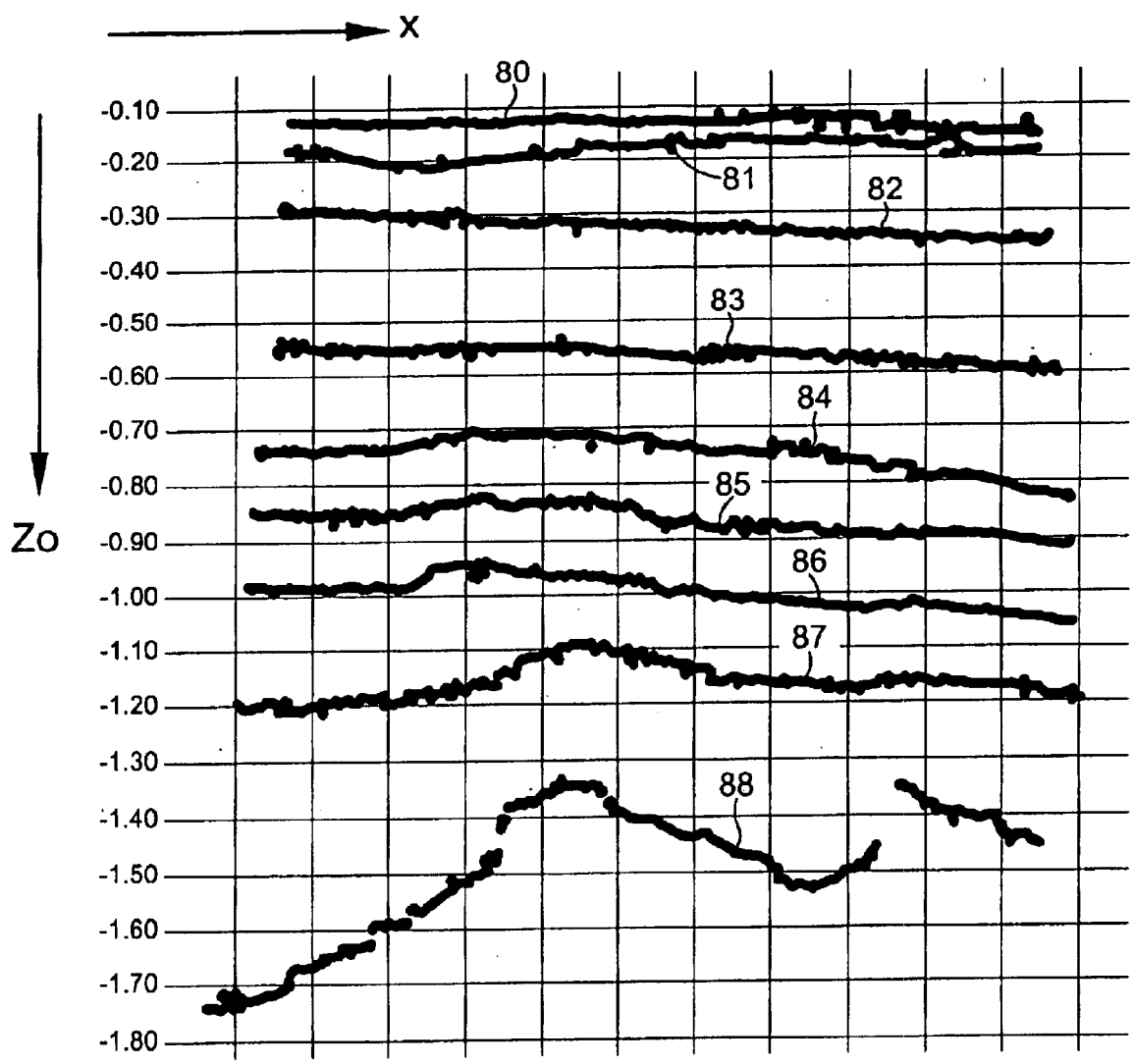
FIG. 9 is a graphic representation of a P-P depth section as occurs at logic step 70 of FIG. 8.

Referring to FIG. 9, a P-P depth section as would be formed at logic step 67 and displayed at logic step 70 of FIG. 8 is illustrated. Each of the graphs 80–88 of FIG. 9 are functions of depth $z_o$ and distance x, and represent a P-P depth image gather displayed at logic step 70 of FIG. 8. Further, each of the image gathers occurs at a different depth $z_o$. An inspection of the graphs 80–88 of FIG. 9 indicates that one of graphs 80 and 83 would be selected as a P-P depth consistent image gather for further processing at logic step 69 of FIG. 8.

Figure 10:
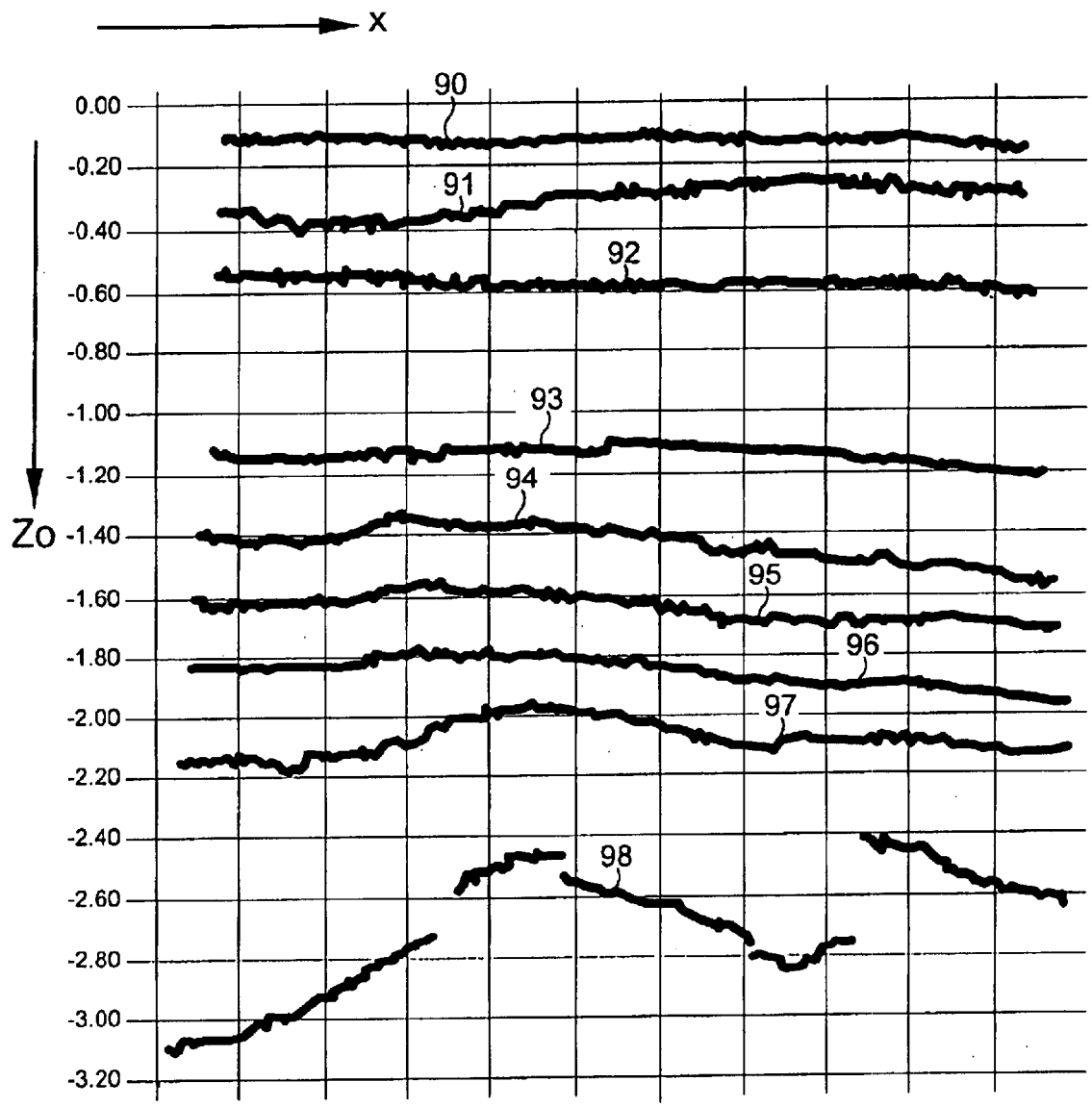
FIG. 10 is a graphic representation of a P-S depth section as occurs at logic step 71 of FIG. 8.

In like manner, FIG. 10 illustrates a P-S depth section as would be formed at logic step 68 of FIG. 8 and displayed at logic step 71. The graphs 90–98 of FIG. 10 are functions of depth $Z_o$ and distance x, which represent a P-S depth image gather as displayed at logic step 71. An inspection of graphs 90–98 of FIG. 10 indicates that one of graphs 90 and 92 would be selected as a P-S depth consistent image gather for further processing at logic step 69 of FIG. 8.

Figure 11:
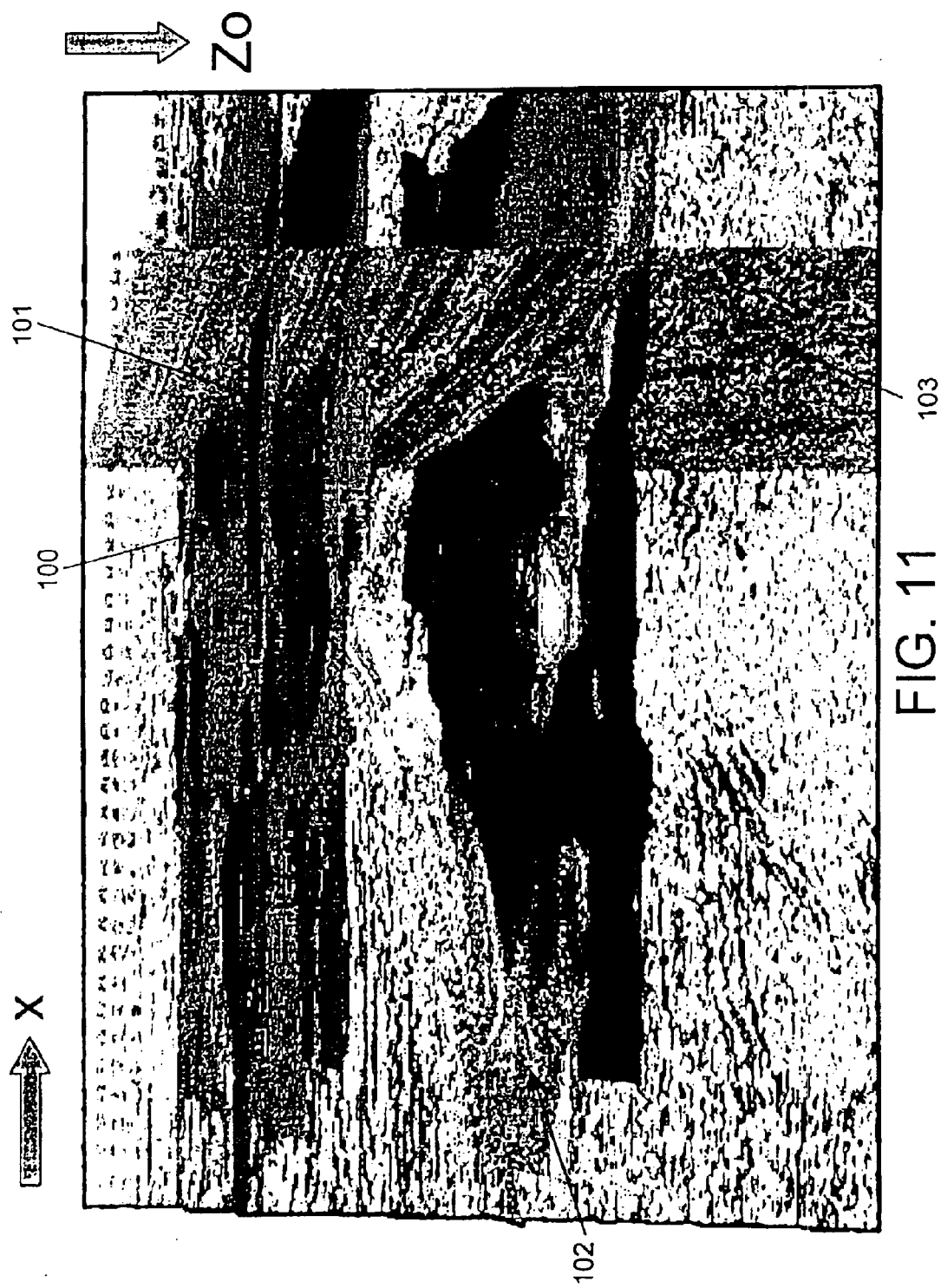
FIG. 11 is a graphic representation of the P-P horizons selected for depth consistency from the P-P horizon images of FIG. 9.

FIG. 11 is a 3D illustration of three horizons 101, 102, and 103 which are selected from the depth consistent image gathers of FIG. 9. A P-P vertical depth section 103 is shown slicing through the horizons 101, 102, and 103.

Figure 12:
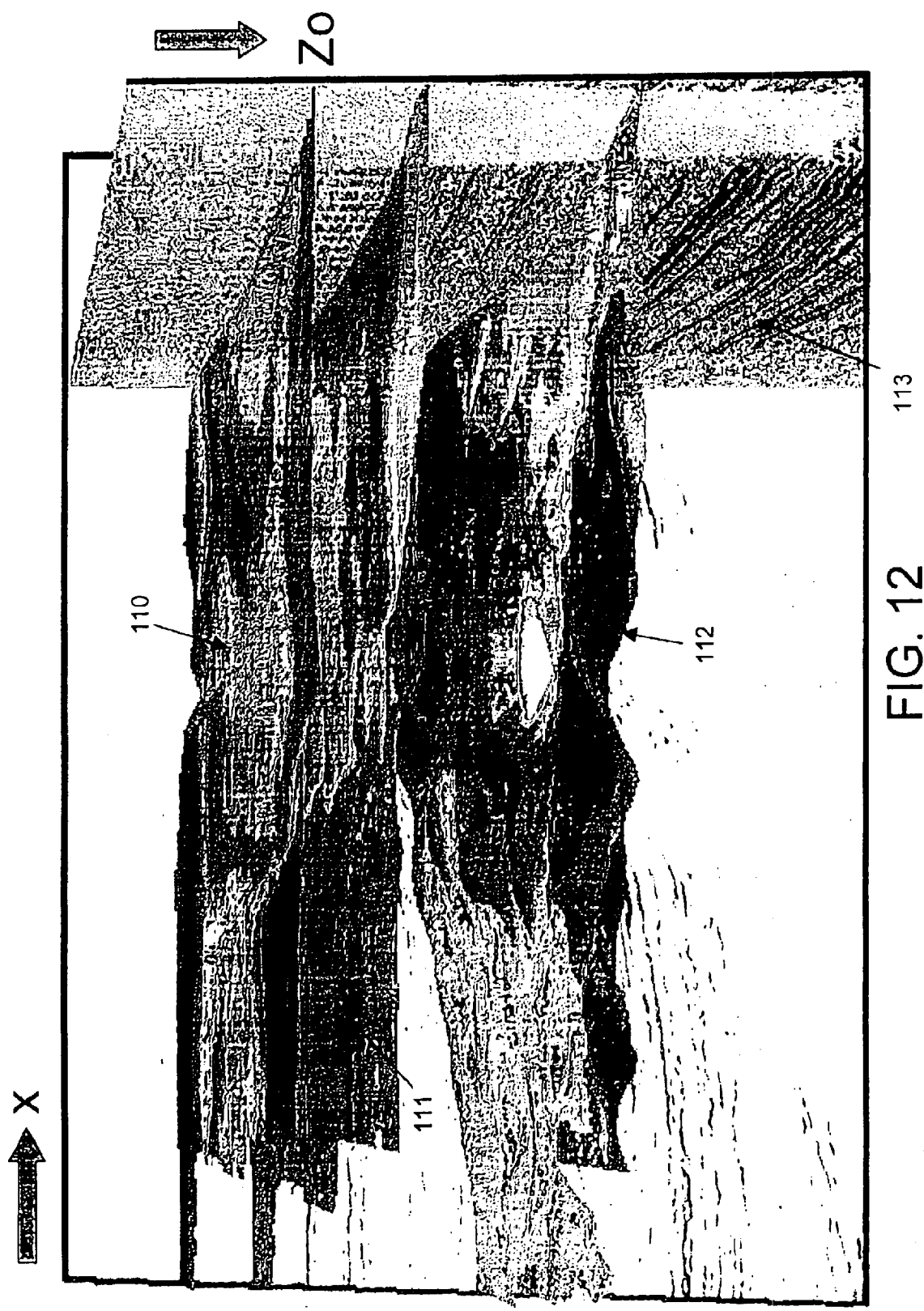
FIG. 12 is a graphic representation of the P-S horizons selected for depth consistency from the P-S horizon images of FIG. 10.

FIG. 12 is a 3D illustration of three horizons 110, 111, and 112 which are selected from the depth consistent image gathers of FIG. 10. A P-S vertical depth section 113 is shown slicing through the horizons 110, 111, 112.

In summary, the joint velocity inversion in depth of depth consistent horizons at logic step 69 of FIG. 8 provides three critical parameters for the estimation of anisotropic parameters in the presence of VTI anisotropy: the vertical depth $z_o$, the vertical P-wave velocity $v_{po}$, and the vertical S-wave velocity $v_{so}$, Anisotropic parameters δ and σ thereupon may be calculated directly in the depth domain, whether or not well log data is available, to further refine the estimates of $z_o$, $v_{po}$, and $v_{so}$.

It will be apparent to those skilled in the art that numerous modifications can be made to the invention embodiment described herein without departing from the spirit and scope of the invention. Accordingly, the invention is not limited by the foregoing description, but is only limited by the scope of the appended Claims.

What is claimed is:

1. A method of updating, in a CPU, velocity determinations for anisotropic P-P and P-S prestack depth migration in a transversely isotropic media with vertical symmetry, which comprises:

identifying corresponding reflections from P-P and P-S near-offset seismic waves received from a seismic source and reflected by a subsurface layer to form P-P and P-S depth consistent image gathers;

performing a joint velocity inversion in depth on said P-P and P-S depth consistent image gathers to estimate a vertical depth $z_o$, a vertical P-wave velocity $v_{po}$, and a vertical S-wave velocity $v_{so}$ of said subsurface layer;

determining an isotropic depth migration of P-P depth consistent image gathers comprising said depth consistent image gathers based upon said vertical depth $z_o$, said vertical P-wave velocity $v_{po}$, and said vertical S-wave velocity $v_{so}$ to estimate vertical isotropic depth $z_{pp}$ of said subsurface layer;

calculating anisotropic parameters δ and σ based upon said vertical isotropic depth $z_{pp}$, said vertical P-wave velocity $v_{po}$, and said vertical S-wave velocity $v_{so}$; and repeating the above steps beginning with the step of performing a joint velocity inversion in depth until said vertical P-wave velocity $v_{po}$ and said vertical S-wave velocity $v_{so}$ are substantially unchanged.

2. A method for updating, in a CPU and without access to well log data, anisotropic parameters from near-offset prestack P-P and P-S seismic data, and from P- and S-wave velocity models for velocity ray tracing, which comprises the steps:

determining prestack depth migration of said near-offset prestack P-P and P-S seismic data to form P-P and P-S depth image gathers;

selecting corresponding depth consistent image gathers from said P-P and P-S depth image gathers;

performing joint velocity inversion in depth on said depth consistent image gathers to estimate vertical P-wave velocity $v_{po}$, vertical S-wave velocity $v_{so}$, and vertical depth $Z_o$;

determining P-P isotropic depth migration of P-P depth consistent image gathers comprising said depth consistent image gathers to estimate isotropic depth $z_{pp}$;

calculating estimate of an anisotropic parameter $\delta$ based upon said isotropic depth $z_{pp}$;

calculating an anisotropic parameter $\sigma$ based upon said anisotropic parameter $\delta$; and repeating the above steps until estimates of said vertical P-wave velocity $v_{po}$ and said vertical S-wave velocity $v_{so}$ remain substantially unchanged.

3. The method of claim 2, wherein said joint velocity inversion in depth is performed in accordance with the following equations:

$$v_{po}^{(i)} = v_{po}^{(i-1)} + \frac{z_s^{(i-1)} - z_p^{(i-1)}}{z_p^{(i-1)}} \frac{\gamma_o^{(i-1)} v_{po}^{(i-1)}}{1 + \gamma_o^{(i-1)}},$$

where $z_p$ and $z_s$ are respectively P-P and P-S depth migrations, $v_{po}$ is a vertical P-wave velocity, $v_{so}$ is a vertical S-wave velocity, $\gamma_o$ is a velocity ratio $v_{po}/v_{so}$, and i denotes iteration cycles;

$$v_{so}^{(i)} = v_{so}^{(i-1)} + \frac{z_p^{(i-1)} - z_s^{(i-1)}}{z_s^{(i-1)}} \frac{v_{so}^{(i-1)}}{1 + \gamma_o^{(i-1)}};$$

$$z_p^{(i)} = z_p^{(i-1)} + \frac{\gamma_o^{(i-1)}(z_s^{(i-1)} - z_p^{(i-1)})}{1 + \gamma_o^{(i-1)}}; \text{ and}$$

$$z_s^{(i)} = z_s^{(i-1)} + \frac{(z_p^{(i-1)} - z_s^{(i-1)})}{1 + \gamma_o^{(i-1)}}.$$

4. The method set forth in claim 2, wherein said anisotropic parameter $\delta$ is approximated in accordance with a formula $$\delta \approx \frac{z_{pp} - z_p}{z_o} = \frac{\Delta z_{pp}}{z_o}.$$

5. The method set forth in claim 2, wherein said anisotropic parameter $\sigma$ is approximated in accordance with a formula:

$$\sigma \approx \gamma_o^2 \left(\frac{\Delta z_{pp}}{z_o^2}\right)\left[\frac{\gamma_o}{2} \frac{\Delta z_{pp}}{z_o} + 1\right].$$

6. A seismic data processing system for obtaining accurate post stack images of subsurface layers in presence of VTI anisotropy, which comprises:

a receiver having recorded therein prestack P-P seismic data and prestack P-S seismic data; and a CPU in electrical communication with said receiver and receiving said prestack P-P seismic data and said prestack P-S seismic data from said receiver, and operating upon first near-offset data of said prestack P-P seismic data and upon second near-offset data of said prestack P-S seismic data to create P- and S-wave velocity models and identify both P-P depth consistent image gathers and P-S depth consistent image gathers on which a joint velocity inversion in depth is performed to estimate anisotropic parameters $v_{po}$, $v_{so}$, and $z_o$, and determine P-P isotropic depth migration of said P-P depth consistent image gathers to provide isotropic depth $z_{pp}$, and calculate approximations of anisotropic parameters $\delta$ and $\sigma$ based upon said anisotropic parameters $v_{po}$, $v_{so}$, and $z_o$, and said isotropic depth $z_{pp}$, and thereafter continue the above operations until $v_{po}$ and $v_{so}$ remain substantially unchanged.

7. A seismic data processing system, which comprises:

a seismic source means for providing P-P and P-S seismic waves reflected by a subsurface layer in presence of VTI anisotropy; and processing means for receiving said P-P and P-S seismic waves and selecting therefrom near-offset data, for forming P-P and P-S depth consistent image gathers from said near-offset data, for performing a joint velocity inversion in depth on said P-P and P-S depth consistent image gathers to estimate vertical velocities and vertical depth of said subsurface layer; for determining isotropic depth migration of P-P depth consistent image gathers comprising said P-P and P-S depth consistent image gathers based upon said vertical velocities and said vertical depth to estimate a vertical isotropic depth of said subsurface layer, and for calculating anisotropic parameters from said vertical velocities and said vertical isotropic depth to update said vertical velocities.

8. A method of processing in a CPU both P-P seismic data and P-S seismic data received from a seismic source to obtain accurate post stack images of subsurface layers in presence of VTI anisotropy, which comprises:

operating upon first near-offset data of said P-P seismic data to determine P-P wave prestack time migration, and upon second near-offset data of said P-S seismic data to determine P-S wave prestack time migration;

performing a post stack joint velocity inversion upon said P-P wave prestack time migration and said P-S wave prestack time migration to obtain interval velocities in depth;

creating initial P-P and P-S velocity models from said interval velocities in depth;

creating P-wave and S-wave velocity models from said initial P-P and P-S velocity models;

determining P-P prestack depth migrations and P-S prestack depth migrations from said P-wave and S-wave velocity models, said first near-offset data, and said second near off-set data;

forming P-P depth image gathers from said P-P prestack depth migrations, and P-S depth image gathers from said P-S prestack depth migrations;

selecting depth consistent image gathers from said P-P depth image gathers and from said P-S depth image gathers;

performing a joint velocity inversion in depth on said depth consistent image gathers to obtain estimates of $v_{po}$, $v_{so}$, and $z_o$;

performing an isotropic depth migration by scanning focus velocities of P-P depth consistent image gathers comprising said depth consistent image gathers to obtain an isotropic depth $z_{pp}$;

calculating estimates for anisotropic parameters $\delta$ and $\sigma$ based upon $z_o$, said isotropic depth $z_{pp}$, $v_{po}$, and $v_{so}$;

updating said P- and S-wave velocity models based upon $v_{po}$, $v_{so}$, $z_o$, said isotropic depth $z_{pp}$, and said anisotropic parameters $\delta$ and $\sigma$; and repeating the above steps beginning with the step of creating P- and S-wave velocity models until $v_{po}$ and $v_{so}$ remain substantially unchanged.

* * * * *